Patented Dec. 15, 1936

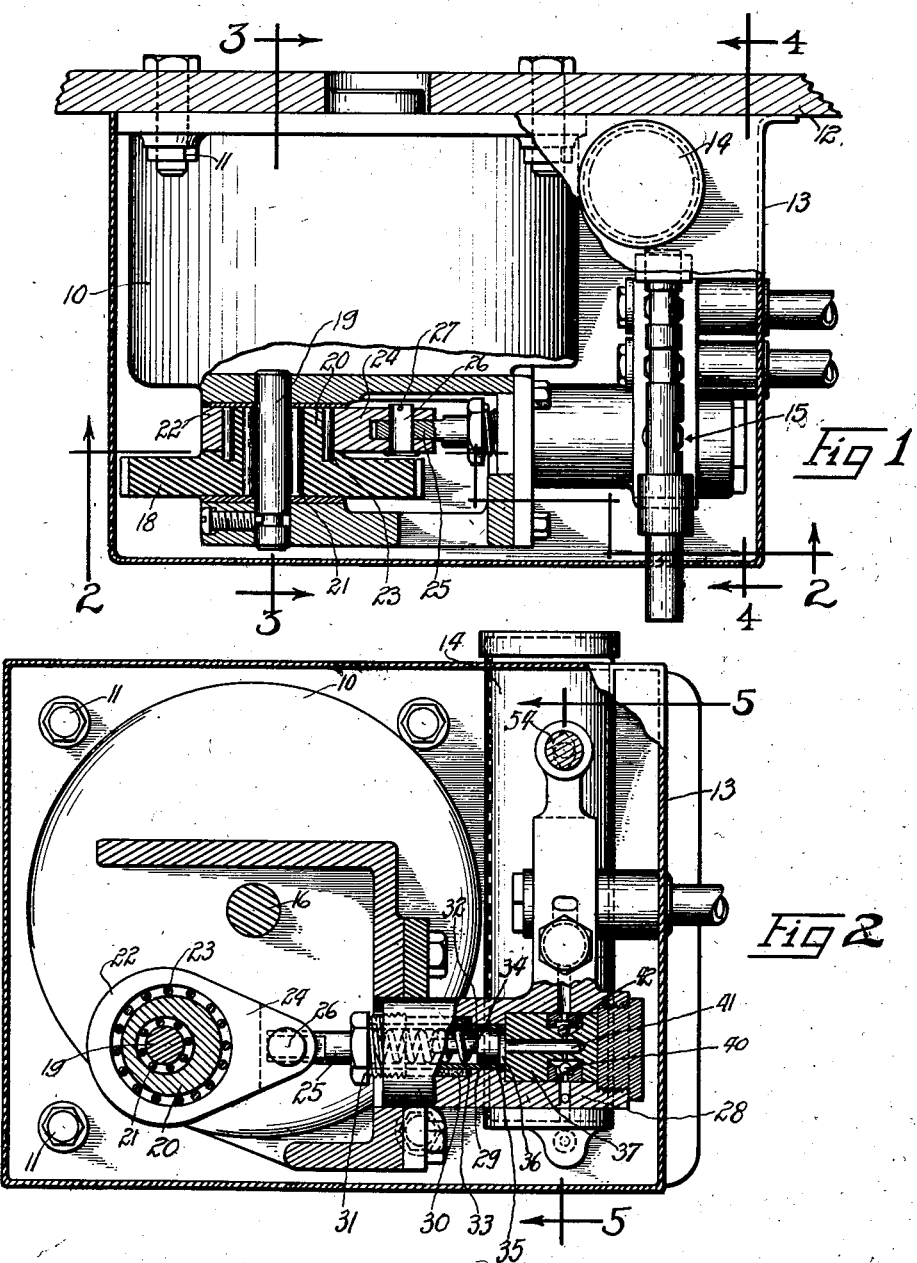

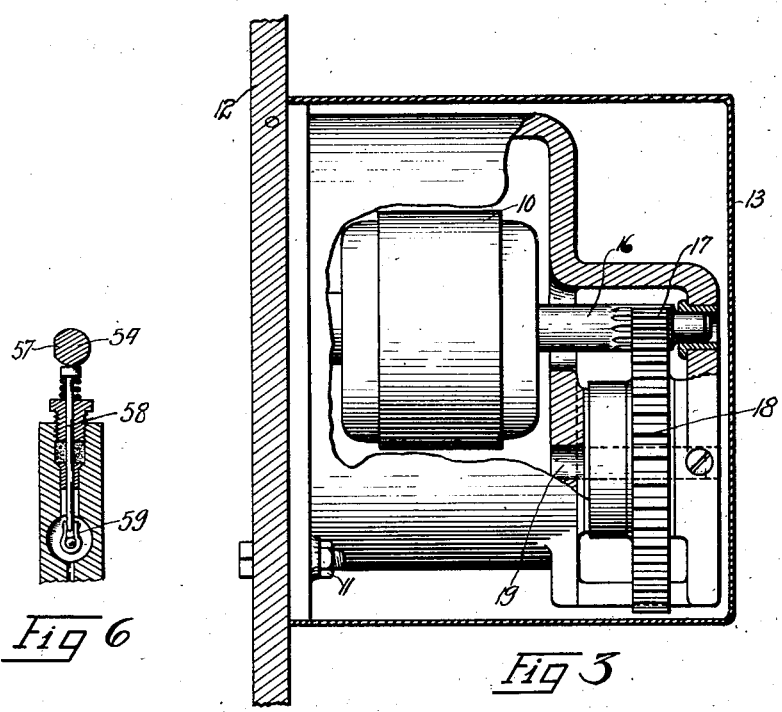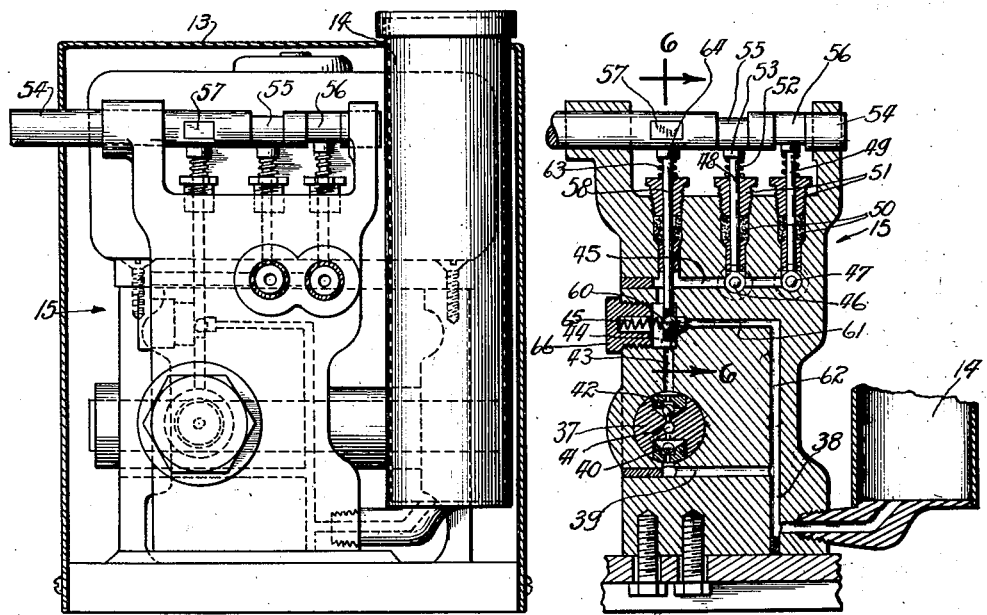

2,064,265

UNITED STATES PATENT OFFICE 2,064,265

VALVE STRUCTURE FOR PUMPING SYSTEMS

Harold J. Marlowe, Brooklyn, N. Y., assignor to Jackomatic Corporation, a corporation of Delaware Application March 24, 1932, Serial No. 600,853

7 Claims. (Cl. 251—56)

This invention relates to valve structures and has particular application in hydraulic pumping systems wherein there is provided a liquid reservoir, a device of some character to be hydraulically operated, a pump for taking liquid from the reservoir and forcing it under pressure from a chamber, arranged at the high pressure side of the pump, to the device to be operated, and a passageway between the high pressure chamber and the reservoir, the passageway constituting a by-pass through which the liquid is returned from the device to the reservoir for use over again.

The valve structure referred to herein is disclosed in my co-pending application, Serial No. 552,428, filed July 22nd, 1931, wherein a pump system such as that herein shown is employed to operate a plurality of lifting jacks, but the valve structure itself is susceptible of being used with systems other than that herein illustrated, as will be evident to those versed in the art.

The valve structure with which the instant invention deals has been illustrated in connection with the opening and closing of the by-pass referred to and is constructed in such a way that two forces are present due to the liquid pressure in the chamber at the high pressure side of the pump, one force tending to seat the valve to close the bypass and the other tending to unseat the valve to open the bypass. With this arrangement very little additional force is required to unseat the valve regardless of the pressure at the high pressure side of the pump.

In the specific embodiment of the invention illustrated, the valve means comprises a ball carried in a stirrup at the end of a valve stem, one force due to the pressure in the system acting on the ball to seat the valve, while at right angles thereto a second force acts at one end of the valve stem tending to unseat the valve. The valve stem is controlled from a shaft mounted in the pump casing and provided with a depression which, when turned in register with the outer end of the rod, permits the latter to move under the influence of a spring to unseat the valve, whereas, when the shaft is turned to move the depression out of register with the end of the rod, the valve is again seated. Due to the nature of the valve arrangement, the spring may be comparatively light, despite the fact that the pressure in the system is high.

It is also an object of the invention to provide certain details of construction and arrangement of parts tending to enhance the efficiency of a device of this character.

Other and equally important objects will become apparent from a perusal of the invention which comprises the means described in the following specification, particularly pointed out in the claims forming a part thereof, and illustrated in the accompanying drawings, in which Fig. 1 is a plan view of the pump and the driving unit.

Fig. 2 is a section on the line 2—2 of Fig. 1.
Fig. 3 is a section on the line 3—3 of Fig. 1.
Fig. 4 is a section on the line 4—4 of Fig. 1.
Fig. 5 is a section on the line 5—5 of Fig. 2, and Fig. 6 is a detailed section on the line 6—6 of Fig. 5.

Referring to the several views of the drawings, 10 designates an electric motor which imparts drive to the pump and is connected to any suitable source of electric power.

The motor is secured by a plurality of screws 11 to an upright wall 12, and is enclosed by a casing 13 which houses the reservoir 14 and the pump 15.

The support of the motor or the general arrangement of the pump and reservoir do not form a part of the invention.

The motor is equipped with a shaft 16 carrying a pinion 17 meshing with a gear 18 fast on a counter-shaft 19.

An eccentric sleeve 20 surrounds the shaft 19, and is maintained in proper relation thereto by roller bearings 21. The sleeve 20 is again surrounded by a ring 22 and is spaced therefrom by roller bearings 23.

The ring 22 at one end is provided with an extension 24 which is bifurcated to receive therein a shaft 25, which is secured in the bifurcation by a pin 26 extending through the bifurcated ends of the extension 24 and is held in place by a pin 27.

A pump casing 28 is provided with a bore 29, provided with a packing 30 and a packing gland 31.

The shaft 25 is formed integral with a sleeve 32 adapted to reciprocate in the pump casing 28.

The sleeve 32, constituting a plunger, receives a spring 33 which surrounds the piston rod 34 of a piston 35.

The spring 33 rests with one end against the bottom of the plunger 32, while its other end abuts with the piston 35.

The piston 35 is provided with a V-shaped groove 36, and is always in stationary position in contact with a chest 37, so that it partially seals the plunger chamber and prevents the plunger chamber from receiving air and retaining it in the event the reservoir 14 is empty as will be hereinafter further explained.

From the foregoing, it is obvious that upon rotation of the countershaft 19, which is geared to the electric motor 10 by the gears 17 and 18, the plunger is reciprocated to suck oil from the reservoir or container 14 by way of channels 38, 39 past a check valve 40 in the valve chest 37 into a bore 41, and thence is forced past another check valve 42 into a channel 43 which leads to a chamber 44.

A channel 45 admits the operating fluid to the valves 46 and 47 which control egress of the operating fluid to places of application or use.

The valve 40 controls communication between the bore 41 and the channel 39 which leads to a vertical bore 38 communicating with the reservoir 14 containing oil or other liquid which serves as the operating fluid.

The check valve 42 controls communication between the bore 41 and the vertical bore 43 which leads to a chamber 44 communicating with a horizontal bore 45 (Fig. 5).

The valves 46 and 47 are arranged in spaced relation in the bore 45 and are controlled by push rods 48 and 49, respectively, which extend into the pump casing and are each provided with suitable packing 50 and glands 51.

A spring 52 is interposed between the packing gland and the head 53 of the push rods 48 and 49 to normally maintain the push rods out of engagement with the appertaining rods 48 and 49, respectively.

A horizontal shaft 54 is provided with cams 55 and 56, respectively to control the push rods 48 and 49. The cams 55 and 56 are offset with respect to one another, so that in one position of the shaft 54 the valve 46 is dislodged, whereas in the other position of the shaft 54 the valve 47 is dislodged enabling oil to pass selectively through the channels controlled by the valves 46 and 47.

The shaft 54 is also equipped with a square cam 57 which, as appears from Fig. 6, is formed by flattening the surface of the shaft, so that the cam itself occupies a level lower and nearer to the center of the shaft than its periphery.

The cam 57 controls the push rod 58 of similar construction as the push rods 48 and 49, and is provided at the lower end with a stirrup member 59 to hold in place a valve 60 which controls communication between the chamber 44 and a horizontal bore 61 communicating with a vertical bore 62 joining the bore 38 leading to the reservoir 14.

The cam 57, as mentioned before, is in a lower plane than the periphery of the shaft 54 to enable the spring 63 controlling the head 64 of the push rod 58 to lift the same, when the low portion of the cam is turned opposite the upper end of the rod 58, and in this lifting movement the valve 60 participates, as it is arranged in the stirrup member 59 secured to the push rod 58. As the pressure in the chamber 44 acts in all directions, there is a force present (resulting from the pressure), acting on the valve 60 and urging it upon its seat, while at the same time there is another force (likewise due to the pressure) acting on the stirrup and on the lower end of the rod 58, tending to lift the rod and unseat the valve 60. As a result of this arrangement, the spring 63 need be of comparatively little strength to effect the opening of the valve despite the high fluid pressure in the chamber 44.

The pump, reservoir, motor and accessory parts are all arranged within the casing 13 to form an operating unit which may be easily secured and removed as a unit.

In use, if the reservoir 14 should be empty, the reciprocation of the plunger will not cause air to be received in the plunger chamber as the piston 35 with the groove 36 partially seals the plunger chamber.

The valve 60, of course, is held in place by a spring 65 which is seated in a recess of a screw 66 threaded into an opening in the pump casing, as will be apparent by reference to Fig. 5.

While the drawings disclose a preferred embodiment of the invention, the same are merely illustrated by way of explanation and not by way of limitation. Numerous changes, alterations, and revisions may be made within the purview of the invention.

I, therefore, do not wish to limit myself to the details of construction or arrangement of parts, as shown, but claim my invention as broadly as the state of the art permits.

I claim:

1. A valve structure including, in combination, a pressure chamber, a passageway opening into said chamber, a valve for establishing and disestablishing communication between the pressure chamber and the passageway, said valve including a ball arranged to close the passageway to the chamber, a valve stem separate from the ball and extending through the wall of the chamber and provided at its inner end with means wherein the ball is freely movable with respect to the stem, and means for urging the ball to passageway closing position.

2. A valve structure according to claim 1, wherein the means provided at the end of the valve stem for carrying the ball includes a stirrup.

3. A valve structure according to claim 1, wherein the means for urging the ball to passageway closing position includes a spring.

4. A valve structure including, in combination, a pressure chamber, a passageway opening into said chamber, a valve for establishing and disestablishing communication between the pressure chamber and the passageway, said valve including a ball arranged to seat in the opening of the passageway to close the same to the chamber, a valve stem extending through the wall of the chamber and provided at its inner end with means wherein the ball is freely movable with respect to the stem, actuating means for the stem for holding it in valve closing position, and spring means associated with the valve stem for unseating the ball when said stem is released from its actuating means.

5. A valve structure including, in combination, a pressure chamber, a passageway opening into said chamber, a valve for establishing and disestablishing communication between the pressure chamber and the passageway, said valve including a ball arranged to seat in the opening of the passageway to close the same to the chamber, a valve stem extending through the wall of the chamber and provided at its inner end with means wherein the ball is freely movable with respect to the stem, spring means associated with the valve stem, and manually adjustable cam means cooperating with the valve stem and adapted when adjusted to one position to move the stem to seat the ball, and when adjusted to another position to allow the spring means to move the stem to unseat the ball.

6. A valve structure including, in combination, a pressure chamber, a passageway opening into said chamber, a valve for establishing and disestablishing communication between the pressure chamber and the passageway, said valve including a ball arranged to seat in the opening of the passageway to close the same to the chamber, means for positioning the ball in the vicinity of the passageway and wherein the ball is freely movable with respect to said means, and means including cam instrumentalities operated from the exterior of the pressure chamber for operating the valve.

7. A combination according to claim 6, wherein spring means are provided for urging the valve to passageway closing position.

HAROLD J. MARLOWE.